Nov. 7, 1950  H. W. KOST  2,529,219
FASTENER FOR STEMS OR THE LIKE
Filed Aug. 8, 1945
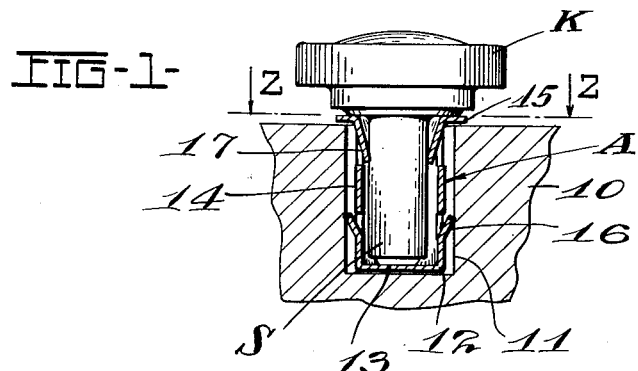
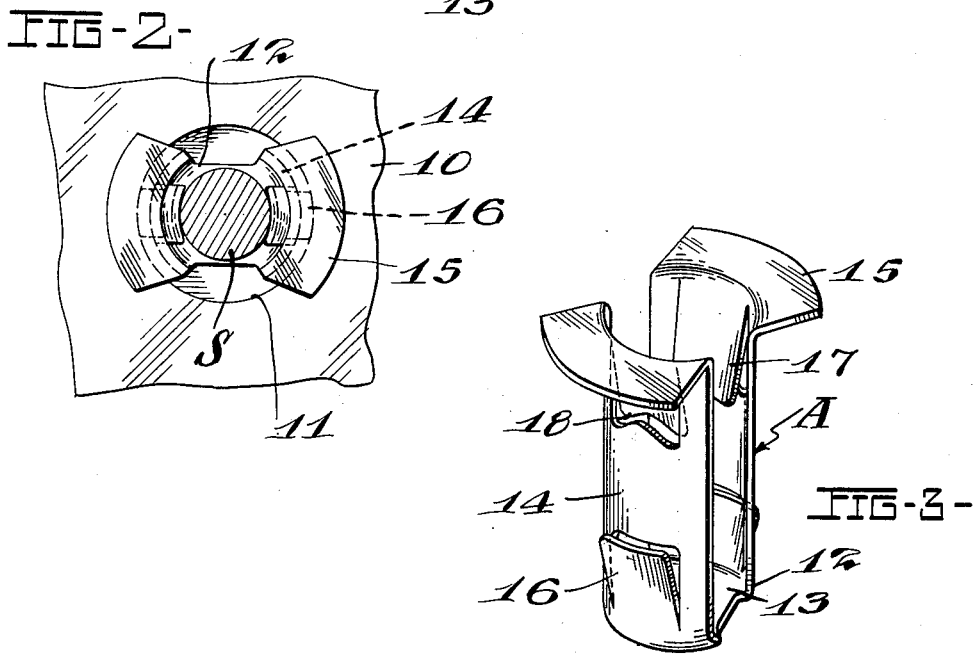
INVENTOR.
HAROLD W. KOST
BY
*Malcolm W. Pracer*
attorney Patented Nov. 7, 1950

2,529,219

UNITED STATES PATENT OFFICE 2,529,219

FASTENER FOR STEMS OR THE LIKE

Harold W. Kost, Toledo, Ohio, assignor, by mesne assignments, to Prestole Corporation, Toledo, Ohio, a corporation of Michigan Application August 8, 1945, Serial No. 609,596

1 Claim. (Cl. 85—5)

This invention relates to fasteners particularly adapted for securing stems or shanks to a support, and an object is to produce a simple and efficient fastener of this character which can be produced from a single piece of sheet material by stamping, which can be conveniently mounted without the use of special tools, and to which a relatively smooth shank or stem can be attached securely by simply pushing it into engagement therewith, and which is so designed that it can be manufactured economically on a production basis.

Other objects will appear as the description proceeds, and for purposes of illustration but not of limitation, an embodiment of the invention is shown in the accompanying drawings in which Figure 1 is a fragmentary sectional view of the fastener and associated supporting structure and knob-carrying stem;

Figure 2 is an enlarged transverse sectional view on the line 2—2 of Figure 1; and Figure 3 is a perspective view on an enlarged scale, of the fastener.

The illustrated embodiment of the invention comprises a supporting structure 10 which is formed with a socket 11 of annular cross section. Fitting into the socket 11 is a fastener A for securing the stem S of a knob K to the supporting structure 10. The knob K may be of plastic and used for ornamentation, to provide a handle or for other purposes. The desideratum is to enable the stem S to be readily and conveniently secured to the supporting structure without the use of screws or similar fasteners.

As shown, the fastener A comprises a one-piece body 12 formed by stamping from a sheet of spring metal. The body 12 is generally U-shaped and has a relatively flat bottom wall 13 from which extend at substantially right angles a pair of arms 14 which are curvilinear in cross section. The arms 14 are approximately equal to the depth of the socket 11 and are spaced slightly from the walls of the socket. Integral with and extending outwardly from the free ends of the arms 14 are flanges 15 which engage the supporting structure 10 at opposite sides of the mouth of the socket 11.

Struck from the lower or inner end portion of each arm 14 is a rectangular-shaped, outwardly inclined spring finger 16, which is adapted to impinge against the adjacent wall of the socket 11, thereby militating against retrograde movement of the fastener but enabling it to be readily forced into the socket in position of use. It will be observed that the spring fingers 16 are arranged in diametrically opposed relation and the free ends extend in the general direction of the flanges 15. To conform to the contour of the socket 11, the fingers are arcuate in order more securely to engage the socket wall.

At the upper portion of the arms 14 directly beneath the flanges 15 are inwardly extending, rectangular spring fingers 17 which are struck from the walls of the arms. The fingers 17 extend in a direction opposite to that of the fingers 16 in order to impinge upon the surface of the stem S. As shown, the fingers 17 are arcuate in cross section and notches 18 are formed in the free ends in order to engage a greater area of the stem S.

It will be manifest that the fastener A can be readily forced into the socket 11 and the stem can either prior thereto or subsequently, be forced between the arms of the fastener. The fingers 16 securely hold the fasteners in place while the fingers 17 bite into the stem S militating its withdrawal and holding it firmly in position. The simplicity of the structure adapts it admirably to economic manufacture in large quantities.

It is to be understood that numerous changes in details of construction, arrangement and operation may be effected without departing from the spirit of the invention especially as defined in the appended claim.

What I claim is:

Fastening device of the class described comprising in combination a supporting member having a cylindrical socket, a plastic stem extending into said socket, a fastener for retaining said plastic stem within said socket, said fastener comprising a one-piece spring metal stamping having a U-shaped body, the base of the U being disposed in the region of the bottom of the socket, opposite arms of said U-shaped body being curvilinear in cross section to conform to the curvature of the socket walls, integral outwardly extending flanges on the free ends of the arms of the body engaging the face of the supporting member at the mouth of the socket, the arms of the body being spaced from the adjacent walls of the socket, a pair of oppositely arranged resilient fingers struck from the body and inclining outwardly therefrom with the free ends extending in the general direction of said flanges and impinging against the adjacent wall of the socket for retaining the fastener therein, said fingers being curvilinear in cross section to conform in general to the curvature of the socket wall, and a second pair of spring fingers struck from the fastener body, spaced longitudinally from said first fingers and inclining inwardly with the free ends in impinging engagement against the adjacent surface of the plastic stem for retaining same against outward movement relative to the socket.

HAROLD W. KOST.

REFERENCES CITED

The following references are of record in the file of this patent:

UNITED STATES PATENTS

| Number | Name | Date |
| --- | --- | --- |
| 942,693 | Wintermute | Dec. 7, 1909 |
| 2,184,783 | Tinnerman | Dec. 26, 1939 |
| 2,244,975 | Tinnerman | June 10, 1941 |
| 2,295,444 | Woodward | Sept. 8, 1942 |